United States Patent [15] 3,700,685
Hoff et al. [45] Oct. 24, 1972

[54] NITROIMIDAZOLE DERIVATIVES
[72] Inventors: Dale R. Hoff, Basking Ridge, N.J.;
Clarence S. Rooney, Beaconsfield, Quebec, Canada
[73] Assignee: Merck & Co. Inc., Rahway, N.J.
[22] Filed: May 15, 1970
[21] Appl. No.: 37,894

[52] U.S. Cl. ..............................260/309, 424/273
[51] Int. Cl. .............................................C07d 49/36
[58] Field of Search.......................................260/309

[56] References Cited

UNITED STATES PATENTS

| | | | |
|---|---|---|---|
| 3,438,992 | 4/1969 | Shen et al. | 260/294.8 F |
| 3,290,328 | 12/1966 | Kollonitsch | 260/309 |
| 3,376,311 | 4/1968 | Butler | 260/309 |
| 3,390,150 | 6/1968 | Henry | 260/309 |
| 3,341,548 | 9/1967 | Hoffer | 260/309 |
| 3,435,049 | 3/1969 | Hoffer | 260/309 |
| 3,444,175 | 5/1969 | Shexi et al. | 260/309 |
| 3,459,763 | 8/1969 | Gruenfeld | 260/309 |

FOREIGN PATENTS OR APPLICATIONS

| | | | |
|---|---|---|---|
| 739,982 | 8/1966 | Canada | 260/309 |

*Primary Examiner*—Natalie Trousof
*Attorney*—I. Louis Wolk and J. Jerome Behan

[57] ABSTRACT

5-Nitroimidazoles substituted with 2-lower-alkylene sulfides and the corresponding sulfoxides and sulfones are disclosed, as well as their preparation from the 2-(haloloweralkyl)-5-nitroimidazoles and a salt of a mercaptan. Compositions containing these compounds as the active ingredient for treatment of bacterial and prolozaal infections are also disclosed.

4 Claims, No Drawings

NITROIMIDAZOLE DERIVATIVES

SUMMARY OF THE INVENTION

This invention relates to substituted 5-nitroimidazoles and processes for making the same. In particular this invention relates to alkyl-(1-substituted-5-nitroimidazol-2-yl)alkyl sulfides, sulfoxides and sulfones, and their preparation from 1-substituted-5-nitroimidazol-2-ylalkyl halides.

The compounds of this invention are active against a number of protozoa and bacteria. Particularly high activity is observed against *Trypanasoma cruzi*, the parasitic cause of the American forms of trypanosomiasis known as Chagas' disease. The compounds are also active against *Endamoeba histolytica*, and *Mycoplasma gallisepticum* which cause amoebic dysentery in humans and respiratory diseases in chickens, respectively.

In chickens the symptoms usually observed are a nasal discharge and a swelling below the eye. Coughing, sneezing and a hoarse throat rattle may accompany these symptoms. The economic loss associated with the disease is a drop in egg production of at least 10 to 40 percent and a poor hatchability of fertile eggs. There is a loss of weight of the birds and a substantial mortality rate which is especially significant at about four weeks of age. The *Mycoplasma gallisepticum* is a microorganism commonly known as the pleuropneumonia-like organism (PPLO), the effects of which are referred to in the art as PPLO infections.

Another activity possessed by the compounds is the suppression of the formation of dental plaque in the periodontal model in experimental animals. Test animals fed a cariogenic diet, rich in sucrose, were found to be substantially free of dental plaque when fed water treated with the compounds of the invention at concentrations as low as 0.05 percent. Animals fed the same cariogenic diet, but given untreated water were found to have developed a heavy deposit of bacterial plaque on all tooth surfaces. A causative factor of periodontal diseases is the gingivites and other inflamatory responses of the connective tissue associated with teeth as a result of bacterial enzyme release of the dental plaque. Thus reducing the bacterial release reduces dental plaque and results in less periodontal disease.

The compounds of this invention have the formula:

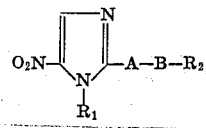

where $R_1$ is loweralkyl or substituted loweralkyl, the substituent being hydroxy.

A is methylene, ethylene, or ethylidene.

B is sulfide (—S—), sulfoxide (—SO—), or sulfone (—SO$_2$—). The latter two groups are also named as sulfinyl or sulfonyl groups.

$R_2$ is alkyl possessing up to 12 carbon atoms, loweralkenyl, phenyl, or halophenyl. The alkyl chain may be either straight, branched or cyclic. The cyclic alkyl groups are those possessing from five to seven carbon atoms in the ring. The lower straight or branched alkyl groups may be substituted, those substitutions being chosen from halogen, hydroxyl, amino, diloweralkyl amino, carbamoyloxy, phenyl or halophenyl.

In this invention, "lower" when used in describing alkyl, alkylene or alkoxy is taken to mean that the radical contains one to six carbon atoms which may optionally be branched. Methyl, ethyl, propyl, butyl, amyl, hexyl, ethenyl, propenyl, butenyl, pentenyl, hexenyl, methoxy, ethoxy, propoxy, butoxy, amyloxy, and hexoxy are exemplary.

"Halogen" or "halo" in this invention may be fluorine, chlorine, bromine or iodine although fluorine, chlorine and bromine are preferred.

Preferred Embodiments of the Invention

Representative compounds of this invention where $R_1$ is methyl are: methyl-(1-methyl-5-nitroimidazol-2-yl)-methylsulfide; 2-hydroxyethyl-(1-methyl-5-nitroimidazol-2-yl)-methylsulfide; benzyl-(1-methyl-5-nitroimidazol-2-yl)-ethylsulfide; allyl-(1-methyl-5-nitroimidazol-2-yl)-1-ethylsulfide; and 2-aminoethyl-(1-methyl-5-nitroimidazol-2-yl)ethylsulfide hydrochloride. $R_1$ may be other than methyl as for example in ethyl-[1-(2-hydroxyethyl)-5-nitroimidazol-2-yl]methylsulfide; allyl-[1-(2-hydroxyethyl)-5-nitroimidazol-2-yl]methylsulfide; and methyl-[1-(2-ethoxyethyl)-5-nitro-imidazol-2-yl]ethylsulfide.

A is methylene, ethylene, or ethylidene. It is exemplified by the following compounds: ethyl-(1-methyl-5-nitroimidazol-2-yl)methylsulfide; ethyl-(1-methyl-5-nitroimidazol-2-yl)ethylsulfide; and methyl-(1-methyl-5-nitroimidazol-2-yl)-1-ethylsulfide.

$R_2$ is composed of a chain containing up to 12 carbon atoms which may be straight, branched, or cyclic. The loweralkyl chains, where "lower" is as defined above, either straight, branched or cyclic, may be substituted. Halogen atoms may be substituted either on the loweralkyl chain or on a phenyl group which may be a substituent of the chain. Exemplary of these compounds are: Amyl-(1-methyl-5-nitroimidazol-2-yl)methylsulfide; allyl-[1-(2-hydroxyethyl-5-nitroimidazol-2-yl]-1-ethylsulfide; cyclohexyl-[1-(2-hydroxyethyl)-5-nitroimidazol-2-yl]ethylsulfide; o-chlorobenzyl-[1-(2-hydroxyethyl)-5-nitroimidazol-2-yl]-ethylsulfide; carbamoyloxyethyl-(1-methyl-5-nitroimidazol-2-yl)methylsulfide, and the like.

$R_2$ is also phenyl or halophenyl as in phenyl-(1-methyl-5-nitroimidazol-2-yl)methylsulfide and o-chlorophenyl-(1-methyl-5-nitroimidazol-2-yl)methylsulfide.

The sulfoxides and sulfones formed from the corresponding sulfides are also an integral part of this invention. Examples of sulfoxides and sulfones of this invention are to be found from any of the hereinabove enumerated sulfides by changing the name to sulfoxide or sulfone as required, as well as the following: 2-aminoethyl-(1-methyl-5-nitroimidazol-2-yl)methylsulfoxide, o-chlorobenzyl-(1-methyl-5-nitroimidazol-2-yl)-ethyl-sulfoxide, amyl-(1-methyl-5-nitroimidazol-2-yl)ethylsulfone, m-chlorobenzyl-(1-methyl-5-nitroimidazol-2-yl)-methyl-sulfone, m-chlorophenyl-(1-methyl-5-nitroimidazole)-methylsulfoxide, p-chlorophenyl-(1-methyl-5-nitroimidazol-2-yl)methylsulfone, methyl-(1-methyl-5-nitroimidazole-2-yl)methylsulfone 2-carbamoyloxyethyl-(1-methyl-5-nitro-imidazol-2-yl)methylsulfone, and the like.

Process of the Invention

One process for making the compounds of this invention is as outlined in the following flow chart:

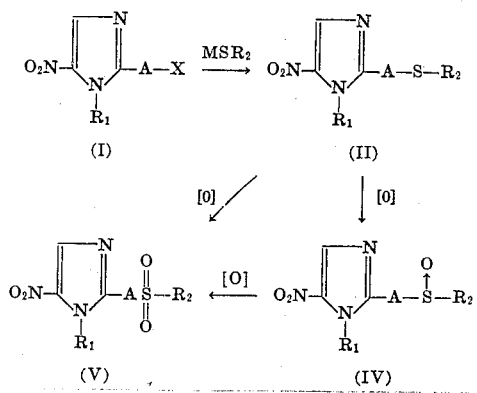

(I)  (II)

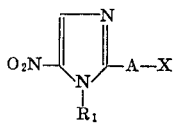

(V)  (IV)

where $R_1$, $R_2$, and A are as previously defined, and X is a halide.

The 1-substituted-5-nitroimidazol-2-ylalkyl halide (I) is converted to the corresponding $R_2$ substituted sulfide (II) by treatment with an alkali metal (M) or organic ammonium salt of an $R_2$ substituted mercaptan. Compound (II) can be oxidized selectively to give either the sulfoxide (IV) or the sulfone (V). According to said process of this invention, a 1-substituted-5-nitroimidazol-2-yl-loweralkyl halide of the formula:

$$O_2N-\underset{R_1}{\text{Im}}-A-X$$

where X is a halide such as chlorine, bromine, or iodine, and A and $R_1$ are as defined above, is reacted with a metal or amine salt of a mercaptan. The salt is prepared by dissolving the appropriate mercaptan, $R_2$—SH in a suitable solvent and treating it with a suitable organic or inorganic base. We have found alkali metal bases to be preferable, especially alkali metal alkoxides and hydroxides such as sodium methoxide, sodium ethoxide, potassium tert. butoxide, sodium hydroxide, potassium hydroxide, triethylamine, or tetra-n-butylammoniumhydroxide.

The reaction may optionally be run without using a salt of the mercaptan, that is, using just the nitroimidazole alkyl halide of formula I above, and the free mercaptan. However, the presence of the free HX in the reaction medium tends to prevent the reaction from going to completion and yields are severely diminished. The alkali metal salt of the mercaptan formed in solution, preferably in a polar organic solvent such as a lower alkanol, ethanol, or methanol usually being preferred, is mixed with the 1-substituted 5-nitroimidazol-2-yl-loweralkyl halide in a similar solvent at a temperature of about −15 to +15°C. When the addition is complete, the reaction is warmed to a temperature of from about room temperature to the reflux temperature of the solvent employed. The duration of heating depends on the temperature as well as the reactivity of the materials employed, but we have found the reaction to be essentially complete after about 2 to 20 hours.

At the end of the reaction time, the precipitate of metal halide salt is filtered and washed with a non-polar organic solvent; ethyl acetate has been found to give satisfactory results. The combined organic solvents are evaporated and the residue is recrystallized from a suitable solvent such as isopropanol. When the product is difficult to crystallize or is an oil, a solution of the crude material in a suitable solvent is passed through a column of alumina or silica gel and the resulting solution is evaporated to dryness to recover the purified material.

In those reactions in which a basic function, such as amine, is an integral part of the mercaptan, such as 2-aminoethanethiol or 2-(N,N-dimethyl)ethanethiol, the base or alkali metal alkoxide may be dispensed with since the basic function of the mercaptan neutralizes the HX displaced in the reaction, yielding the hydrohalide salt of the product.

Another process of this invention leading to the formation of the sulfides (II) is as set forth in the following flow chart.

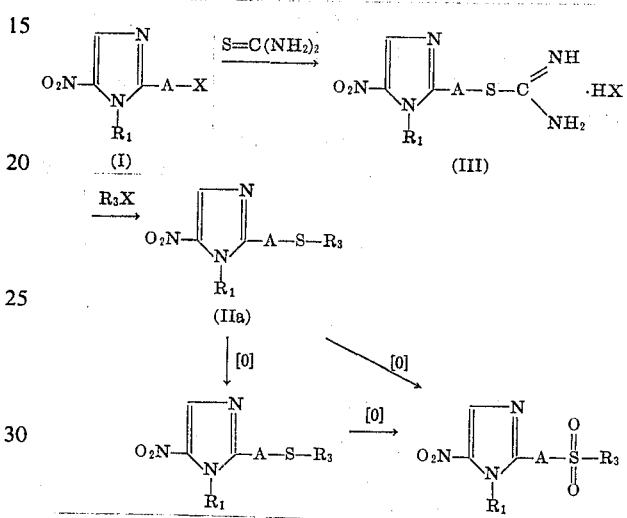

where R, A and X are as previously defined, and $R_3$ is a lower alkyl or a lower alkenyl. The halogen atom of the lower alkyl or lower alkenyl group need not be the same halogen atom of the nitroimidazolalkyl halide, although such a situation is possible.

In this embodiment of the invention a 1-substituted-5-nitroimidazol-2-ylalkyl halide (I) is reacted with thiourea to form a 1-substituted-5-nitroimidazol-2-ylalkyl isothiouronium hydrohalide salt of the formula:

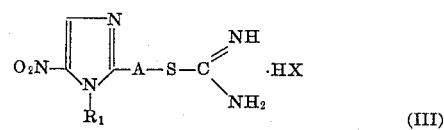

(III)

where X is a halide, preferably chlorine or bromine and A and $R_1$ are as previously defined. Compound III is dissolved in an organic solvent compatible with base and a solution of a base preferably in the form of an alkali or an alkali metal hydroxide or alkoxide, is added and the solution stirred from 5 to 60 minutes, after which a lower alkyl halide of from one to five carbon atoms or a lower alkenyl halide of from one to five carbon atoms is added and the reaction is stirred at a temperature of between room temperature and the reflux temperature of the solvent employed, during which time the sulfide (IIa) is formed. The duration of heating depends on the temperature, but we have found the reaction to be essentially complete in from 15 minutes to 6 hours.

The solvent is then evaporated to dryness and the residue treated with water of sufficient quantity to dissolve the inorganic materials, and the mixture is then extracted with a water imiscible organic solvent, such as chloroform or ethyl ether. The organic solution is dried and evaporated to dryness recovering the product which may, if desired, be further purified.

The sulfides (II or IIa) obtained as described in either of the above processes may be treated with an oxidizing agent to effect the transition from sulfide (—S—) to sulfinyl (—SO—) and sulfonyl (—SO$_2$—), and afford the corresponding sulfinyl or sulfonyl compounds.

By treating either sulfide II or IIa with one molar equivalent of an oxidizing agent, 30 percent hydrogen peroxide and metachloroperbenzoic acid being preferred, the sulfoxide (IV or IVa) is obtained. The reaction is run in a solvent not oxidizable by the reagent, such as glacial acetic acid, or trifluoro acetic acid, at a temperature substantially that of room temperature, for a duration of from one-half to 18 hours. The product is isolated by the addition of water to the reaction, the volume being approximately that of the solvent used for the reaction. If no precipitation occurs upon the addition of the water, then the reaction is brought to neutrality with aqueous base whereupon the desired sulfoxide precipitates and is filtered. The material may be further purified by recrystallization from a suitable solvent, isopropanol usually being preferred.

Analogous to the above procedure is the oxidation of the sulfide to the sulfone V or Va utilizing at least 2 molar equivalents of the oxidizing agent. This oxidation is carried out under similar conditions as above. However, higher temperatures of up to about 100°C. may be used to effect the oxidation. After cooling, if no precipitate is noted immediately, water is added and the mixture is neutralized to cause precipitation of the sulfone, whereupon it is filtered and recrystallized as in the case of the sulfoxide.

If desired the sulfone can be prepared from the sulfoxide by combining the latter compound with one mole of oxidizing agent and then heating as above.

The compounds of this invention hereinabove described when used as an anti-protozoal agent in animals may be administered orally as a component of the animal feed stuff, in the drinking water, in salt blocks, and in unit dosage forms such as tablets, boluses or drenches; or parenterally either in solution or in suspension in an aqueous medium. The vehicle in which the active ingredient is distributed should be one that is chemically compatible with the particular compound selected, non-inhibiting with respect to the action of the antiprotozoal agent and essentially nontoxic to the host animal under the conditions of use.

The concentration of active ingredient present in the composition will depend on the particular method of administration, the compound being employed, and the particular disease being combatted. Where the method of administration is one of the unit dose forms such as tablets, boluses or drenches, a concentration of 5 to 50 percent by weight is suitable. Where the composition is in a supplementary administration form such as a feed premix, or drinking water additive which is diluted prior to actual use, a concentration of 15 to 75 percent is suitable.

In using the compounds of this invention in the treatment and prevention of PPLO infections, they are conveniently fed to the infected animal as a component of the animals feed and also dissolved or suspended in the animals drinking water. The concentration of the compounds of this invention in the feed premix or water additive may be from 5 to 75 percent by weight with 25 to 50 percent being preferable. The remainder of the feed premix usually consists of orally ingestable feed additives such as grains, corn meal, citrus meal, crushed limestone and the like. Preferred drinking water formulations are water soluble powders, aqueous suspensions or solutions along with suitable suspending agents such as acacia, tragacanth, carboxypolymethylene, methyl cellulose and the like. After the feed premix or drinking water additive has been diluted into the finished feedstuff or final drinking water the concentration of the active ingredient should be from 0.005 to about 0.5 percent by weight.

If unit dose forms are desired the compounds of this invention may be admixed with any of the pharmaceutical carriers known in the art. Disodium phosphate, starch, magnesium stearate, and the like have proven successful. The concentration of the active ingredient may vary from about 5 to 75 percent by weight with 10 to 50 percent being preferable.

The amount of active ingredient required for treatment or protection varies in accordance with such factors as the particular compound employed, the species of the animal to be treated, the species of infecting protozoa, the severity of infection, and whether the compound is employed therapeutically or prophylactically. Generally for therapeutic use an average daily dose, either administered in one unit or in divided doses as desired, is found in the range of 25 to 500 mg. of active ingredient per kg. of body weight. For prophylactic use a range of from 5 to 250 mg. per kg. is generally sufficient.

In using the compounds of this invention as an antibacterial agent for the prevention of periodontal disease and dental plaque, said compounds are conveniently administered, dissolved or suspended in drinking water or applied topically to the interior surfaces of the oral cavity. The treated drinking water is prepared from a drinking water additive which contains the active ingredient in a concentration of from 5 to 75 percent by weight. The drinking water additive is formulated as described hereinabove such that when diluted, the treated drinking water thus formed contains from 0.005 to 0.5 percent by weight of the active ingredients. The topical formulation for application on the interior surfaces of the oral cavity are any of the administrative forms known in the art. Such administrative forms include suitable tooth pastes and dental creams, tooth powders, lozenges, tablets, foods (especially those containing carbohydrates), candies, chewing gum, mouthwashes and the like. In addition to the active ingredient and the carrier, the above administrative forms may contain sweeteners such as sucrose, lactose, maltose, sorbital, saccharine, and the like. Suitable flavoring agents include the flavoring oils, i.e. oils of spearmint, peppermint, wintergreen, sassafras, clove, lemon, orange, as well as sodium methyl salicylate.

The following examples are presented so that the invention might be more fully understood. They should not be construed as being limitative of the invention.

EXAMPLE 1

Benzyl-(1-Methyl-5-Nitroimidazol-2-yl)-Methylsulfide

A solution of 17.5 g. (0.1m.) of 1-methyl-5-nitroimidazol-2-yl-methylchloride in 50 ml. isopropanol is colled to −5°C. and a previously cooled mixture of 12.4 g. (0.1 m.) of benzyl mercaptan and 11.2 g. (0.1 m.) of potassium tert. butoxide in 45 ml. isopropanol is added slowly to the nitroimidazole solution under nitrogen. The reaction is warmed to room temperature and stirred for 8 hours. The reaction mixture if filtered and the solid material washed with 5 to 10 ml. of ethyl acetate. The combined filtrate and washes are combined and evaporated to dryness to afford benzyl-1-methyl-5-nitroimidazol-2-yl-methylsulfide melting at 81° to 83°C. Recrystallization from isopropanol affords pure material melting at 82° to 85°C.

EXAMPLE 2

Benzyl-(1-Methyl-5-nitroimidazol-2-yl)-Methylsulfoxide 5.26 g. (0.02 m.) of benzyl-(1-methyl-5-nitroimidazol-2-yl)-methylsulfide is dissolved in 10 ml. of glacial acetic acid and 30 percent hydrogen peroxide (2.3 g., 0.02 m.) is added with stirring. The reaction is stirred for 14 hours at room temperature after which 10 ml. of water is added to the reaction with stirring, followed by sufficient 20 percent sodium hydroxide solution to bring the pH to 8, whereupon a precipitate is formed. The solid benzyl-(1-methyl-5-nitroimidazol-2-yl)-methylsulfoxide is filtered and recrystallized from isopropanol to afford material melting at 118° to 120°C. The product is dissolved in ethanol and passed through a column of alumina. The ethanol solution is evaporated to dryness affording pure benzyl-(1-methyl-5-nitroimidazol-2-yl)-methylsulfoxide melting at 119° to 120°C.

EXAMPLE 3

Benzyl-(1-Methyl-5-Nitroimidazol-2-yl)-Methylsulfone 7.89 g. (0.03 m.) of benzyl-(1-methyl-5-nitroimidazol-2-yl)-methylsulfide is dissolved in 8.0 ml. of trifluoroacetic acid. 6.8 g. (0.06 m.) of 30 percent hydrogen peroxide is added and the reaction is stirred for 3 hours during which time precipitation occurs. The reaction is cooled to 15°C. and filtered affording solid benzyl-(1-methyl-5-nitroimidazol-2-yl)-methylsulfone. Recrystallization first from benzene and then from isopropanol affords pure material melting at 239° to 242°C.

EXAMPLE 4

Methyl-(1-methyl-5-nitroimidazol-2-yl)methylsulfide

To a solution of 3.5 g. (0.02 Moles) of 2-chloromethyl-1-methyl-5-nitroimidazole in 25 ml. of ethanol is added 1.5 g. (0.02 Moles) of thiourea. The solution is refluxed for 1 hour after which time crystallization occurs. The crystalline suspension is cooled to 0°C. and filtered affording 1-methyl-5-nitroimidazol-2-yl-methylthiouroniumhydrochloride which is used without further purification in the next step.

0.503 g. (0.02 Moles) of 1-methyl-5-nitroimidazol-2-yl-methylthiouroniumhydrochloride is dissolved in 100 ml. of methanol and cooled to 0°C. 4 ml. of a solution containing 0.04 m. Moles of sodium methoxide is added and the solution stirred for 15 minutes. 0.28 g. (0.02 Moles) of methyl iodide is then added and the reaction stirred for 3 hours at room temperature. The reaction mixture is then evaporated to dryness and 5 ml. of water is added to the residue followed by 50 ml. of chloroform. The resulting solvent layers are separated The chloroform layer is dried with $MgSO_4$, filtered, and evaporated to recover an oil which solidifies to methyl-(1-methyl-5-nitroimidazol-2-yl)methylsulfide melting at 40° to 43°C. The product is recrystallized from ether-hexane to afford pure product melting at 46° to 58°C.

In a similar manner, using allyl bromide, allyl-(1-methyl-5-nitroimidazol-2-yl)-methylsulfide, m.p. 34 to 36°C. is obtained.

EXAMPLE 5

Ethyl-(1-methyl-5-nitroimidazol-2-yl)methylsulfide

Following the procedure of Example 1 and using 9.39 g. (0.15 m.) of ethyl mercaptan, 26.3 g. (0.15 m.) of 2-chloromethyl-1-methyl-5-nitroimidazole, 16.8 g. (0.15 m.) of potassium tert. butoxide and 125 ml. of isopropanol, there is obtained ethyl-(1-methyl-5-nitroimidazol-2-yl)-methylsulfide. Purification is effected by recrystallization from isopropanol. The pure product melts at 82° to 85°C.

Following the above procedure using 2-chloroethanethiol in place of ethyl mercaptan there is obtained 2-chloroethyl-(1-methyl-5-nitroimidazol-2-yl)methylsulfide, melting point 94° to 96°C.

EXAMPLE 6

2-Hydroxyethyl-(1-methyl-5-nitroimidazol-2-yl)methylsulfide

A solution of 350 mg. (0.002 m.) of 2-chloromethyl-1-methyl-5-nitroimidazole in 10 ml. of methanol is cooled to 0°C. and a previously cooled mixture of 150 mg. (0.002 m.) of 2-hydroxyethanethiol and 134 mg. (0.002 m.) of sodium ethoxide in 5 ml. of methanol is added to it under nitrogen. The reaction is then stirred at room temperature for 10 hours. The reaction mixture is filtered and the solid material recovered is washed with 1 ml. of ethyl acetate. The combined filtrate and washing are evaporated to dryness. The 2-hydroxyethyl-(1-methyl-5-nitroimidazol-2-yl)methylsulfide may be recrystallized from ethyl acetate/petroleum ether (bp 30° to 60°C.) affording pure material melting at 50° to 52°C.

EXAMPLE 7

1-(1-Methyl-5-nitroimidazol-2-yl)-diethylsulfide
[1(Ethylthio)-1-(1-methyl-5-nitroimidazole-2-yl)ethane]

0.60 g. (5.4 m. Moles) of potassium tert. butoxide 0.366 g. (5.9 m. Moles) of ethanethiol, 0.93 g., (5.3 m. Moles) of 1-methyl-5-nitroimidazol-2-yl-1-ethyl-chloride [1-(1-methyl-5-nitroimidazol-2-yl)-1-chloroethane] and 20 ml. of isopropanol are combined according to the procedure of Example 1. The resulting 1-(1-methyl-5-nitroimidazol-2-yl)diethylsulfide is converted to its hydrochloride salt by treating an ether solution (10 ml.) of the free base with gaseous hydrogen chloride. The 1-(1-methyl-5-nitroimidazol-2-yl)diethylsulfide hydrochloride is somewhat hygroscopic and melts at 98° to 105°C.

EXAMPLE 8

Cyclohexyl-(1-methyl-5-nitroimidazol-2-yl)-methylsulfide 7.4 ml. (62 m. Moles) of cyclohexyl mercaptan, and 6.6 g. (59 m. Moles) of potassium tert. butoxide in 100 ml. of isopropanol are mixed to effect the preparation of the potassium salt of cyclohexyl mercaptan. The reaction is slightly exothermic and the mixture is cooled as necessary to keep the temperature substantially that of room temperature. This solution is added to a suspension of 9.9 g. (56 m. Moles) of 1-methyl-5-nitroimidazol-2-yl-methylchloride in 200 ml. of isopropanol at a temperature of about 10°C. The reaction is stirred at room temperature for 2 hours and cooled in an ice bath. 3.4 ml. of glacial acetic acid is then added with stirring, and the solvent then evaporated to dryness. To the residue is added 5 g. sodium bicarbonate in 300 ml. water and 300 ml. ethyl acetate. The layers are separated and the water layer further extracted with 2 × 150 ml. ethyl acetate. The organic layers are combined, dried, and evaporated to dryness. The oily residue is cooled to −80°C., washed several times with petroleum ether (b.p. 30° to 60°C.) until crystallization of the product occurs. Recrystallization from petroleum ether affords pure cyclohexyl-(1-methyl-5-nitroimidazol-2-yl)-methylsulfide melting at 53° to 57°C.

EXAMPLE 9

2-Aminoethyl-(1-Methyl-5-Nitroimidazol-2-yl)-Methylsulfide-Hydrochloride

A solution of 0.351 g. (0.002 m.) of 1-methyl-5-nitroimidazol-2-yl-methylchloride and 0.154 g. (0.002 m.) of 2-amino ethanethiol in 10 ml. of ethanol is stirred for one hour, during which time precipitation occurs. The resulting solid is filtered, washed with ether and recrystallized from ethanol/ether to afford pure 2-amino-ethyl-(1-methyl-5-nitroimidazol-2-yl)-methylsulfide-hydrochloride melting at 241° to 243°C.

Following the above procedure, using 2-dimethylamino ethanethiol in place of 2-amino ethanethiol there is obtained 2-dimethylaminoethyl-(1-methyl-5-nitroimidazol-2-yl)-methylsulfide-hydrochloride.

EXAMPLE 10

Ethyl-(1-Methyl-5-Nitroimidazol-2-yl)-Methylsulfoxide 6.03 g. (0.03 m.) of ethyl-(1-methyl-5-nitroimidazol-2-yl)-methylsulfide is dissolved in 15 ml. of glacial acetic acid and cooled to 15°C. 6.8 g. (0.06 m.) of 30 percent hydrogen peroxide is added and the reaction stirred at room temperature for 1 hour. 10 ml. of water is added followed by sufficient 20 percent sodium hydroxide solution to bring the solution to a pH of 8. The solution is extracted four times with ethyl acetate (15 ml. each). The extracts are combined, dried, and evaporated to dryness. The solid is recrystallized from isopropanol to afford pure ethyl-(1-methyl-5-nitroimidazol-2-yl)-methylsulfoxide melting at 93° to 94°C.

EXAMPLE 11

Ethyl-(1-Methyl-5-Nitroimidazol-2-yl)-Methylsulfone

To a solution of 8.7 g. (0.043 m.) of ethyl-(1-methyl-5-nitroimidazol-2-yl)-methylsulfide in 20 ml. of glacial acetic acid is added 4.4 ml. (0.043 m.) of 30 percent hydrogen peroxide at 0°C. After 2 hours of reaction, a thin layer chromatography shows the total absence of any sulfide. Another 4.4 ml. (0.043 m.) of 30 percent hydrogen peroxide is then added and the reaction heated on a steam bath for 45 minutes after which a thin layer chromatography reveals only a trace of sulfoxide, the major part of the material having been converted to the sulfone. To the reaction mixture is added 40 ml. of chloroform. The acetic acid is removed by extraction with 20 ml. portions of water and any remaining acid neutralized with a saturated potassium bicarbonate solution. The chloroform is washed once more with water and finally dried and evaporated to dryness. The solid residue is recrystallized from isopropanol to afford pure ethyl-(1-methyl-5-nitroimidazol-2-yl)-methylsulfone melting at 144° to 147°C.

EXAMPLE 12

Ethyl-[1-(2-Hydroxyethyl)-5-Nitroimidazol-2-yl]-Methylsulfide 2.48 g. (0.01 m.) of 1-(2-acetoxyethyl)-5-nitroimidazol-2-yl-methylchloride is dissolved in 5 ml. of isopropanol and cooled to 0°C. A previously cooled solution of 0.625 g. (0.01 m.) of ethyl mercaptan and 1.12 g. (0.01 m.) of potassium tert. butoxide in 10 ml. of isopropanol is added dropwise over a period of 15 minutes. When the addition is complete, the reaction mixture is warmed to room temperature and stirred for 4 hours. The reaction mixture is then evaporated to dryness and the residue is treated with 5 ml. of 6 N. HCl and refluxed for 1 hour to hydrolize the acetoxy group to a hydroxy group. This solution is cooled and neutralized with dilute NaOH and extracted with ethyl acetate. The ethyl acetate extract is dried and evaporated in vacuo to dryness. The solid residue is recrystallized from ethanol to give pure ethyl-[1-(2-hydroxyethyl)-5-nitroimidazol-2-yl]-methylsulfide.

EXAMPLE 13

Ethyl-[1-(2-hydroxyethyl)-5-nitroimidazol-2-yl]-methylsulfoxide

To a solution of 2.3 g. (10 m. Mole) of ethyl-[1-(2-hydroxyethyl)-5-nitroimidazol-2-yl]-methylsulfide in 5 ml. of chloroform is added a solution of 1.72 g. (10 m. Mole) of metachloroperbenzoic acid in 2 ml. of chloroform. The reaction mixture is stirred at room temperature for 1 hour. The reaction mixture is then washed with 5 ml. portions of 20 percent potassium bicarbonate solution until the evolution of $CO_2$ ceases. The chloroform solution is then dried and evaporated in vacuo to dryness to a solid residue. Recrystallization of this material from isopropanol affords substantially pure ethyl-[1-(2-hydroxyethyl)-5-nitroimidazol-2-yl]-methylsulfoxide.

EXAMPLE 14

Ethyl-[1-(2-hydroxyethyl)-5-nitroimidazol-2-yl]-methyl-sulfone

To a solution of 2.3 g. (1 m. Moles) of ethyl-[1-(2-hydroxyethyl)-5-nitroimidazol-2-yl]-methylsulfide in 5 ml. of chloroform is added a solution of 3.5 g. (2 m.

Moles) of metachloroperbenzoic acid in 4 ml. of chloroform. The reaction mixture is stirred and heated at 50°C. for 1 hour. Upon cooling, the chloroform solution is washed with 5 ml. portions of 20 percent potassium carbonate solution until the evolution of $CO_2$ ceases. The chloroform solution is dried and evaporated to dryness. The solid residue which is recrystallized from isopropanol, affords substantially pure ethyl-[1-(2-hydroxyethyl)-5-nitroimidazol-2-yl]-methylsulfone.

EXAMPLE 15 n-Hexyl-(1-methyl-5-nitroimidazol-2-yl)-methylsulfide 250 ml. of methanol, 25 ml. of a solution of sodium methoxide (2 N.) in methanol and 5.7 g. (0.055 Moles) of n-hexanethiol are combined. The solution is stirred for one hour at room temperature after which time 8.8 g. (0.05 Moles) of 1-methyl-2-chloromethyl-5-nitroimidazole is added over 15 minutes. The solution is stirred for 1 hour at room temperature and acidified to pH 4 with 2.5 N. HCl. The solution is evaporated to dryness and 25 ml. of water is added to the residue. The suspension is extracted twice with 100 ml. portions of chloroform. The chloroform extracts are combined, dried with sodium sulfate, and evaporated to dryness to afford n-hexyl-(1-methyl-5-nitroimidazol-2-yl)-methylsulfide which is recrystallized from methanol/hexane to give pure n-hexyl-(1methyl-5-nitroimidazol-2-yl)-methylsulfide, m.p. 57° to 60°C.

When in the above procedure n-dodecane thiol is used in place of n-hexanethiol there is obtained n-dodecyl-(1-methyl-5-nitroimidazol-2-yl)-methylsulfide, melting point 79° to 80°C.

EXAMPLE 16 n-Hexyl-(1-Methyl-5-Nitroimidazol-2-yl)-Methylsulfone 2.6 g. (10 m. Moles) of n-hexyl-(1-methyl-5-nitroimidazol-2-yl)-methylsulfide is added to 5 ml. of chloroform. To this solution is added a solution of 1.72 g. (10m. Moles) of m-chloroperbenzoic acid in 2 ml. of chloroform. The reaction mixture is stirred for 2 hours at room temperature and then washed with 5 ml. of 20 percent potassium bicarbonate solution. The chloroform layer is dried with sodium sulfate and evaporated to dryness to give a residue which is recrystallized from ethanol to afford substantially pure n-hexyl-(1-methyl-5-nitroimidazol-2-yl)-methylsulfoxide.

This sulfoxide is combined with 5 ml. of chloroform and to this is added a solution of 1.72 g. (10 m. Moles) of m-chloroperbenzoic acid in 2 ml. of chloroform. The reaction is heated to 40°C. for 1 hour and the product isolated. Recrystallization from ethanol affords pure n-hexyl-(1-methyl-5-nitroimidazol-2-yl)-methylsulfone.

EXAMPLE 17 p-Chlorophenyl-(1-Methyl-5-Nitroimidazol-2-yl)-Methylsulfide

To a solution of 6.7 g. (60 m. Moles) of potassium tertiary butoxide in 100 ml. of isopropanol at 0°C. is added 7.1 g. (62 m. Moles) of p-chlorobenzenethiol over 10 minutes. The temperature is raised to 25°C. and the stirring is continued for one-half hour. This solution is then added dropwise to a suspension of 10.0 g. (56 m. Moles) of 2-chloromethyl-1-methyl-5-nitroimidazole in 100 ml. of isopropanol maintaining the temperature at 10°C. The reaction is stirred at 10°C. for 1 ½ hours after which time 3.5 ml. (60 m. Moles) of glacial acetic acid is added over 10 minutes. The resulting solution is evaporated to dryness and the resultant residue is treated with 5 g. of sodium bicarbonate, 90 ml. of water and 90 ml. of ethyl acetate. The layers are separated and the water layer further extracted with 2 portions of ethyl acetate, 30 ml. each. The ethyl acetate washings are combined and washed with 200 ml. of a 5 percent sodium carbonate solution. The ethyl acetate layer is dried and evaporated to dryness affording a residue of p-chlorophenyl-(1-methyl-5-nitroimidazol-2-yl)-methylsulfide. The residue is recrystallized from ethyl acetate affording substantially pure p-chlorophenyl-(1-methyl-5-nitroimidazol-2-yl)-methylsulfide, m.p. 159° to 163°C.

When in the above procedure benzenethiol is used in place of p-chlorobenzenethiol, there is obtained phenyl-(1-methyl-5-nitroimidazol-2-yl)-methylsulfide.

EXAMPLE 18 p-Chlorophenyl-(1-Methyl-5-Nitroimidazol-2-yl)-Methylsulfone

The procedure of Example 16 is followed using 2.83 g. (10 m. Mole) of p-chlorophenyl-(1-methyl-5-nitroimidazol-2-yl)-methylsulfide and 1.72 g. (10 m. Mole) of m-chloroperbenzoic acid to afford the p-chlorophenyl-(1-methyl-5-nitroimidazol-2-yl)-methylsulfoxide. When 3.5 g. (10 m. Moles) of m-chloroperbenzoic acid is used there is obtained the corresponding p-chlorophenyl-(1-methyl-5-nitroimidazol-2-yl)-methylsulfone.

EXAMPLE 19

Carbamoyloxyethyl-(1-methyl-5-nitroimidazol-2-yl)-methylsulfide

To a solution of 6.6 g. (59 m. Moles) of potassium tertiary butoxide in 100 ml. is added 7.5 g. (62 m. Moles) of carbamoyloxyethyl sulfide maintaining the temperature at 20°C. The solution is stirred for 15 minutes at room temperature and is then cooled to 0°C. This solution is then added to a suspension of 9.9 g. (56 m. Moles) of 1-methyl-5-nitroimidazol-2-yl-methylchloride in 200 ml. of isopropanol over a period of 20 minutes at 10°C. The cooling bath is removed and the reaction is stirred at room temperature for 2 hours. The temperature is lower to 10°C. and 3.4 ml. of glacial acetic acid is added with stirring over a period of 15 minutes. The solvent is removed in vacuo and 5 g. of sodium bicarbonate, 300 ml. of water, and 300 ml. of ethyl acetate is added to the residue. The organic layer is separated from the aqueous layer and the aqueous layer extracted twice with 150 ml. portions of ethyl acetate. The extracts are combined, dried with magnesium sulfate, and evaporated to dryness in vacuo. The solid residue is recrystallized from isopropanol, recovering substantially pure carbamoyloxyethyl-(1-methyl-5-nitroimidazol-2-yl)-methylsulfide, m.p. 111° to 115°C.

What is claimed is:

1. A 5-nitroimidazole of the formula:

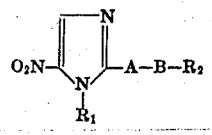

where $R_1$ is loweralkyl or loweralkyl substituted with hydroxy;
A is methylene, ethylene, or ethylidene;
B is sulfide, sulfoxide, or sulfone; and
$R_2$ is phenyl, halophenyl, or alkyl substituted with halogen, hydroxy, amino, diloweralkylamino, carbamoyloxy, phenyl, or halophenyl.

2. A compound of Claim 1 which is p-chlorophenyl-(1-methyl-5-nitroimidazole-2-yl) methyl sulfide.

3. A compound of Claim 1 which is p-chlorophenyl-(1-methyl-5-nitroimidazole-2-yl) methyl sulfoxide.

4. A compound of Claim 1 which is p-chlorophenyl-(1-methyl-5-nitroimidazole-2-yl) methyl sulfone.

* * * * *